Jan. 26, 1960 B. R. ALLEN 2,922,570
AUTOMATIC BOOSTER FAN AND VENTILATING SHIELD
Filed Dec. 4, 1957
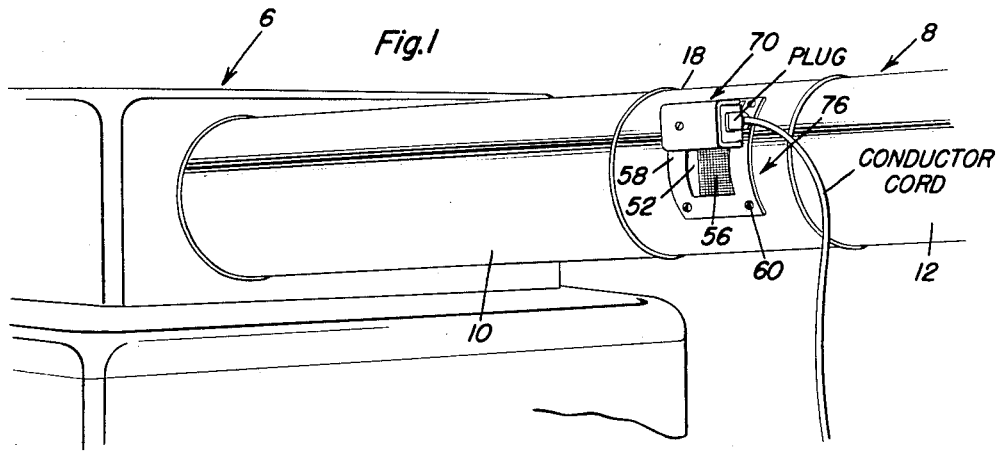
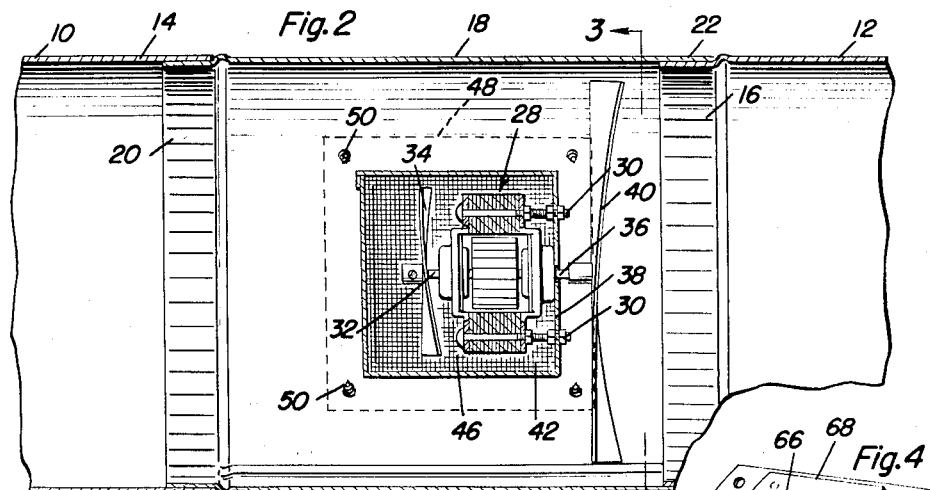
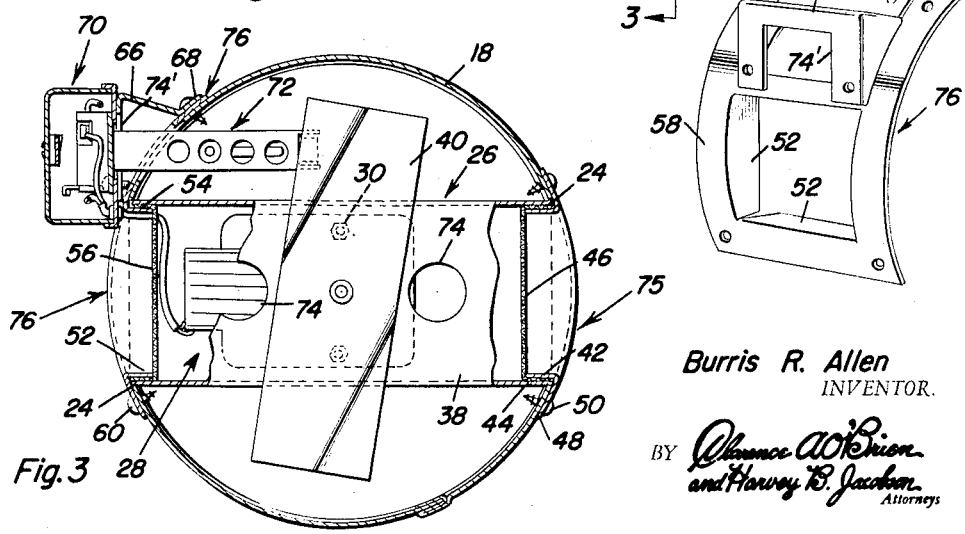
Burris R. Allen
INVENTOR.

United States Patent Office 2,922,570
Patented Jan. 26, 1960

2,922,570

AUTOMATIC BOOSTER FAN AND VENTILATING SHIELD

Burris R. Allen, St. Louis Park, Minn.

Application December 4, 1957, Serial No. 700,609

4 Claims. (Cl. 230—117)

The present invention relates, generally classified, to an electric motor driven booster fan such as is used in the air circulating duct of a hot air gravity-type furnace and has more particular reference to a construction which is automatic in operation, that is, embodies a temperature responsive control device which automatically turns the booster fan off and on in a generally well-known manner.

As the opening statement of the nature of the concept clearly implies, many and varied styles and forms of off and on temperature regulated duct boosters are known. In addition, it is a recognized fact that the fan and motor are not usually protected from the hot air and gases passing through the duct. Consequently, the problem of overheating of the motor and damage to the motor from sticky residue, from gases, and also from accumulating dust necessitates shielding and protecting the motor and parts in some manner or other. Generally speaking, the motor is isolated from the air stream produced by the motor driven fan.

One approach to the problem is revealed in the McLarty fan assembly covered in Patent 2,419,962 of May 6, 1947. McLarty employs what he calls a hat-shaped housing member which has a hollow body member closed at one end and opened substantially at the other end outwardly extending end where there is a flange. The flanged end is fitted in an opening in the wall of the hot air circulating duct. The fan is on the outside of the housing and the motor is enclosed in the housing for protection. Another approach is that which reveals an air duct, a motor within the duct, a fan rotated by the motor and an open ended shielding or protecting case or casing for the motor. This extends across the duct with open ends registering with diametrically opposite openings in the wall of the duct and it is disclosed in the De Bothezat Patent 1,702,632.

An object of the instant invention is to structurally, functionally and otherwise improve upon the prior patents mentioned and any other devices or adaptations which have been evolved and used with a view toward more satisfactorily meeting the safety and fire regulating requirements of city, state and federal authorities regardless of locality. One aspect of the instant matter directed toward the desired goal is the provision of a practical prefabricated ready-to-use structural unit. In carrying out this idea a section or short-length duct is appropriated and it has diametrically opposite openings. The end portions of the electric motor supporting shield or housing register with the openings. The shield is not only a mount and enclosure for the motor but is an auxiliary motor cooling and ventilating duct. The parts are so carefully made that the thus housed and shielded motor may be inserted and removed with a minimum of time and difficulty.

Novelty is also predicated on the construction stated wherein a flanged collar serves to hold one end of the shield or housing in place and in addition functions to position and hold a dust and dirt intercepting screen or filter.

At the opposite end there is a special flanged collar which serves not only in the manner ascribed to the first named collar but functions as a base to support a temperature responsive control unit.

Other objects, features and advantages will become more readily apparent from the following description and the accompanying drawing.

In the accompanying drawing wherein like numerals are employed to designate like parts throughout the views:

Fig. 1 is a perspective view showing a fragmentary portion of a so-called hot air furnace with a single heated air delivering duct in which the improved automatic booster fan is installed and ready to function.

Fig. 2 is an enlarged view wherein the details and their association and arrangement appear with self-explanatory clarity.

Fig. 3 is a cross-section, parts broken away, on the line 3—3 of Fig. 2 looking in the direction of the arrows.

Fig. 4 is a perspective view of the special collar seen to the left in Fig. 3 and which has the purpose not only of a collar but also as a mount for the automatic or temperature responsive control unit.

With reference to Fig. 1, the numeral 6 designates a suitable gravity-type hot air furnace with a conduit or duct 8 communicatively joined with the plenum chamber or head. The duct sections or pipes here involved are designated by the numerals 10 and 12, these being conventional. The invention, as a unit, is installed or interposed between the adjacent ends 14 and 16 of the sections 10 and 12. To accomplish this the casing of the invention which also may be treated as an adapter comprises a short duct section 18 with its ends 20 and 22 telescopically and separably connected with the component parts as shown. Between the ends 20 and 22 the median portion of the duct or section 18 is provided with substantially rectangular diametrically opposite openings to accommodate the cooperating end portions 24 of the insertable and removable booster fan unit or assembly. As already touched upon this assembly is characterized by a sheet metal or an equivalent sleeve which is here referred to as a shield and also a housing 26. That is to say, the simple electric motor (Fig. 2) 28 is housed in the shield and bolted in place, for example, as denoted at 30 in Fig. 2. One end of the motor shaft at the left in Fig. 2 as at 32 has a small motor cooling fan 34 mounted thereon. The other end of the motor shaft at 36 extends through and beyond an opening in the wall 38 of the shield where it is provided with a suitably designed warm air circulating fan. This is a simple blade 40 of the approximate construction illustrated. Clamping and assembling collars are provided at their respective end portions 24 of the shield. For example, the rectangular collar 42 in Fig. 3 telescopes into the end of the shield and clamps the flange portions 44 of a dust intercepting screen 46 in place. The attaching flange of the collar is on the exterior as at 48 where it is suitably fastened in place by the screws or the like 50.

The collar at the left in Fig. 3 is basically the same as the one just described except that here the portions of the collar proper denoted at 52 telescope into the end of the shield and clamp the marginal edge portions 54 of the screen in place. Also as shown in Fig. 3 the attaching flange 58 is held in place by screws or the like 60 and there is an extended end portion which has a substantially triangular hollow mount 62 thereon with a stabilizing flange 68. This mount serves to accommodate the casing of a well-known type of automatic control unit 70. This unit is seen in perspective in Fig. 1 and in section in Fig. 3 and it is of any suitable construction and embodies a temperature responsive switch under the influence of the thermal elements or means 72 extending into the passage of the duct in close proximity to the shield. It extends through an opening 74' provided therefor as shown in Figs. 3 and 4.

It will be evident from Fig. 3 that the wall 38 previously mentioned has ventilating ports 74 therein which may be interpreted as optional but perhaps desirable. With the construction shown the sleeve or shield 26, motor with small and large fans may be mass produced and precision made to be slipped into place to be lined up with the diametrically opposite holes 24. The two clamping and assembling collars, the one 75 at the right and 76 at the left may also be prefabricated making it an easy and business-like matter to put the parts together in readiness for sale and subsequent installation.

As before mentioned it is not new to incorporate a sleeve or an electric motor enclosing shield in a short piece of pipe or a section of a duct, wherein the section is made as an adapter to be fitted into the main duct between existing parts. This is shown in the De Bothezat Patent 1,702,632 and also in the duct booster of the McElroy Patent 2,494,772. Providing diametrically opposite openings so that the shield may be slipped into place and the collars 75 and 76 readily fastened in place for quick assemblage is novel particularly wherein the flanges 42 of the collars serve to anchor the shield 26 and also fasten in place the edge portions of the filters or screens 46 and 50. The incorporation of the fan 34 within the confines of the ventilating duct provided by the shield 26 is novel taken in conjunction with the holes 74 in the wall 38 to allow circulation of air in and around the motor. The multi-purpose collar means 76 in Fig. 4 is a significant advance in the art.

Minor changes in shape, size, materials, and rearrangement of parts may be resorted to in actual practice without departing from the spirit of the invention or the scope of the invention as claimed.

What is claimed as new is as follows:

1. For installation in the usual hot air circulating duct between a furnace and a register in a wall or floor of a room, an automatic booster fan construction comprising a relatively short duct section provided intermediate its respective ends with air circulating openings, a sleeve bridging the passageway of said duct section, said sleeve constituting an open ended shield and the ends of the sleeve being communicatively registered with said air circulating openings, at least one wall of said sleeve being provided with a plurality of vents, an electric motor confined for operation wholly within the limits of the passageway in said sleeve, said motor being bracketed to and supported by said one wall of the sleeve and having a shaft, one end of said shaft extending into the passageway of the sleeve and the other end extending through said one wall into the passageway provided in the aforementioned duct section, a booster fan blade carried by the last named end of the shaft, said booster fan blade rotating in proximity to the one wall and said vents and serving to create the necessary circulating forces to promote free circulation of air through the sleeve and openings in the duct section, and a motor cooling and ventilating fan carried by the first named end of the shaft and confined for operation in the passageway in said sleeve.

2. The structure defined in claim 1, and wherein collars are telescopically fitted into the respective end portions of the sleeve, said collars having outstanding marginal flanges, said flanges being superimposed upon and affixed to cooperating portions of the duct section to thus operatively and removably mount the sleeve in the passageway of the duct section.

3. The structure defined in claim 2 and wherein one of said collars has an extended end portion provided with a hollow portion constituting a mount, a manually adjustable and regulatable automatic control unit removably and accessibly perched on said mount and having temperature responsive switch means and cooperable thermal elements extending through an opening provided therefor in the mount and a further opening provided in the duct section and into the passageway of said duct section.

4. A prefabricated self-contained ventilated booster fan ready for quick and practical installation in the passageway of a hot air furnace duct where said duct has been provided with a pair of diametrically opposite air intake and discharge openings; a sleeve of a length approximately equal to the cross-section of said duct, said sleeve being open at its ends and constituting a support and a shield for a complemental electric motor, at least one wall of said sleeve being provided with a plurality of vents, attaching and retaining collars telescopically and removably fitted into the respective end portions of said sleeve, said collars having lateral attaching flanges and said flanges being adapted to be superimposed on and secured to surfaces of the duct after the collars have been fitted through the openings in the duct with the flanges on the exterior surfaces of the duct for attachment thereto by accessible fasteners, an electric motor arranged and confined in the passageway provided therefor in said sleeve, brackets carried by said motor and securing the same to the wall of the sleeve provided with the stated vents, said motor having a shaft with one end extending through said last-named wall and provided with a ventilating fan adjacent to said wall and cooperating with the vents to generate the suction necessary for a satisfactory circulation of air through said sleeve, the other end of the motor shaft terminating in the passageway in said sleeve and being provided with a cooling fan which serves to circulate air around the motor and aids in circulating air through the passageway in the sleeve and also through the vents in the aforementioned wall, and temperature responsive switch-equipped means supported by one of said collars and having thermal elements paralleling and located in close proximity to a cooperating wall of said sleeve.

References Cited in the file of this patent

UNITED STATES PATENTS

| | | |
|---|---|---|
| 1,702,632 | Bothezat | Feb. 19, 1929 |
| 1,955,106 | Von Normann | Apr. 17, 1934 |
| 2,223,847 | Engdahl | Dec. 3, 1940 |
| 2,419,962 | McLarty | May 6, 1947 |
| 2,494,772 | McElroy | Jan. 17, 1950 |
| 2,638,264 | Browne | May 12, 1953 |